(12) United States Patent
Clarke et al.

(10) Patent No.: US 7,154,098 B2
(45) Date of Patent: Dec. 26, 2006

(54) RUGGEDIZED SCINTILLATION DETECTOR FOR PORTAL MONITORS AND LIGHT PIPE INCORPORATED THEREIN

(75) Inventors: Lucas Lemar Clarke, Uniontown, OH (US); Brian Marshall Palmer, Twinsburg, OH (US); Jeffrey Louis Johanning, Hudson, OH (US); Keith David Jones, Macedonia, OH (US); James R. Williams, University Heights, OH (US); Andrew Emanuel Shalhoub, Twinsburg, OH (US)

(73) Assignee: General Electric Company, Schenectady, NY (US)

( * ) Notice: Subject to any disclaimer, the term of this patent is extended or adjusted under 35 U.S.C. 154(b) by 323 days.

(21) Appl. No.: 10/780,850

(22) Filed: Feb. 19, 2004

(65) Prior Publication Data

US 2005/0184241 A1    Aug. 25, 2005

(51) Int. Cl.
*G01T 1/20* (2006.01)
(52) U.S. Cl. .................................................. 250/368
(58) Field of Classification Search ............... 250/361, 250/368
See application file for complete search history.

(56) References Cited

U.S. PATENT DOCUMENTS

| | | | |
|---|---|---|---|
| 5,579,366 A * | 11/1996 | Doebert et al. | 378/189 |
| 5,742,057 A | 4/1998 | Frederick et al. | |
| 5,796,109 A | 8/1998 | Frederick et al. | |
| 5,962,855 A | 10/1999 | Frederick et al. | |
| 6,222,192 B1 * | 4/2001 | Sekela et al. | 250/361 R |
| 6,355,932 B1 * | 3/2002 | Frederick | 250/368 |
| 6,369,391 B1 * | 4/2002 | Hefetz et al. | 250/368 |
| 6,452,163 B1 | 9/2002 | Frederick et al. | |
| 6,465,788 B1 | 10/2002 | Medley | |
| 6,657,199 B1 | 12/2003 | Frederick et al. | |
| 6,872,937 B1 * | 3/2005 | Williams et al. | 250/256 |
| 2002/0030400 A1 * | 3/2002 | Frederick et al. | 299/95 |

* cited by examiner

*Primary Examiner*—David Porta
*Assistant Examiner*—Djura Malevic
(74) *Attorney, Agent, or Firm*—Nixon & Vanderhye P.C.

(57) ABSTRACT

A radiation detector includes a housing, an elongated, rectangular crystal having four longitudinally extending corners, and a photomultiplier tube both supported in the housing, with a light pipe located axially between respective facing ends of the photomultiplier tube and the crystal; and a plurality of elongated rails extending along respective ones of the longitudinally extending corners of the rectangular crystal, establishing an air gap between the crystal and the housing.

27 Claims, 3 Drawing Sheets

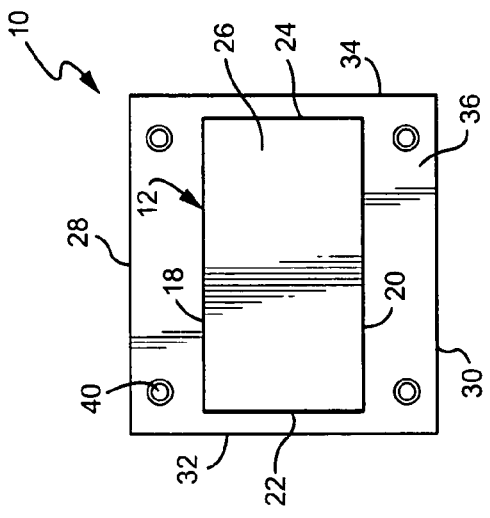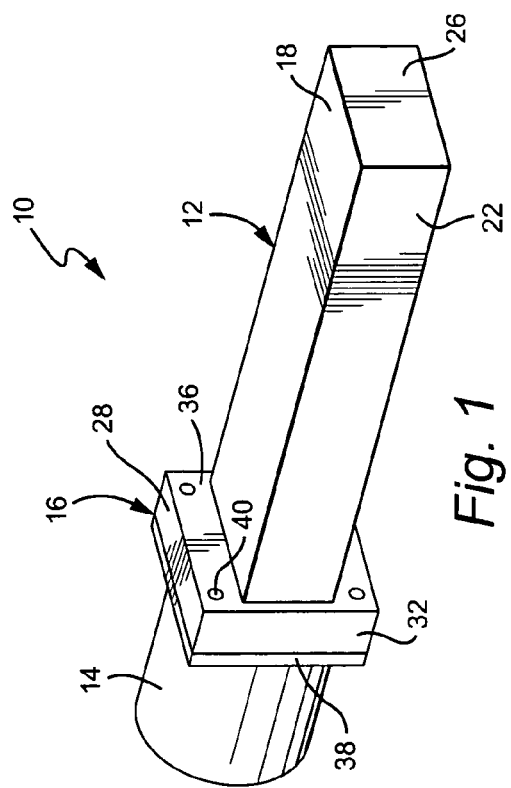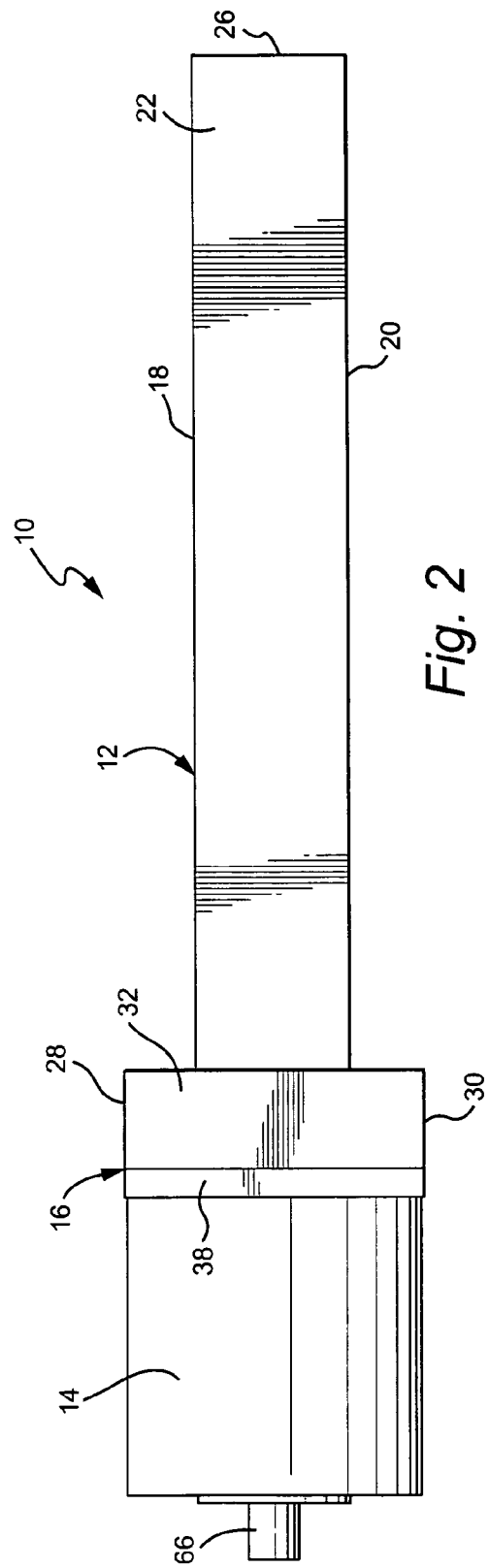

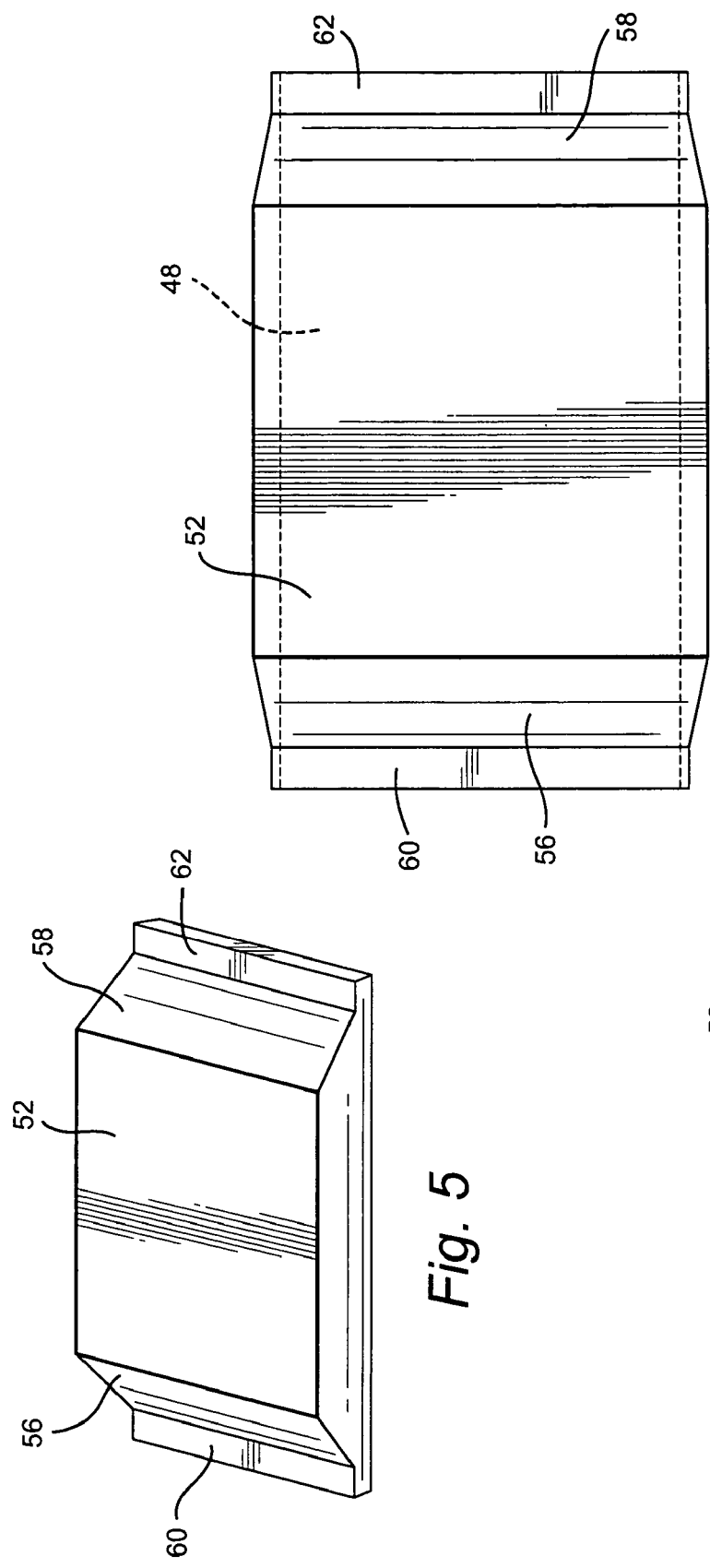

RUGGEDIZED SCINTILLATION DETECTOR FOR PORTAL MONITORS AND LIGHT PIPE INCORPORATED THEREIN

BACKGROUND OF THE INVENTION

This invention relates generally to radiation detectors and, more specifically, to a suspension and protection system for portal monitoring radiation detectors.

Existing portal monitoring radiation detectors are often subjected to varying degrees of shock or vibration during normal usage. In some cases, the degree of shock or vibration exposure may be quite severe. Deleterious effects from shock and vibration may include high background counts, noise in the detector's response spectrum, and even breakage of the detector.

Existing shock and vibration isolation systems for radiation detectors typically consist of either an elastomeric boot that is telescoped over the radiation detector, or a foam pad that is wrapped around the radiation detector. Due to size constraints in portal monitoring radiation detectors, these methods are commonly not even attempted. In many cases, the crystal component of the detector is simply wrapped in a reflective material and then inserted into a 1 mm thick stainless steel housing. A typical crystal component is in the shape of a 2"×4" rectangle that is 16" long. It may be in other shapes, however, one common variation being a 4"×4" square that is also 16" long. These rectangular and square crystal components are then commonly coupled to a photomultiplier tube (PMT). Typical portal monitoring radiation detectors use round PMTs that are easily obtained and tend to have uniform resolution independent of where light interacts with the photocathode. The crystal is coupled to the round PMT with a pseudo rounded-rectangular light pipe that has an efficiency of approximately 65% based on an 8" square inch surface area for the crystal being exposed to approximately 65% of the PMT surface area (for a 3" round PMT). The crystal and the PMT are commonly glued to the light pipe interface, but frequently become uncoupled, however, due to shock, vibration, temperature fluctuations, or other typical field exposures. Moreover, the stainless steel housing and any internal isolation systems that may be employed typically reduce the detector's effectiveness to measure gamma radiation at low energy levels due to their attenuating effects.

Finally, the light pipes and photomultiplier tubes (PMTs) used in these types of detectors are not optimized for light transmission and collection.

BRIEF DESCRIPTION OF THE INVENTION

This invention provides a ruggedized portal monitoring radiation detector with a unique suspension/protection system. Generally, the detector will include a scintillation crystal (usually sodium iodide doped with thallium, but not excessively so); an axial suspension system for both the PMT as well as the scintillating crystal; a radial suspension system for the scintillating crystal to protect it from shock and vibration and to reduce gamma attenuation; an optically modeled light pipe to transmit the light generated by the crystal to the PMT; a square photomultiplier tube (PMT); and an aluminum housing enclosing the crystal to further reduce the attenuation of low energy gamma rays.

More specifically, the crystal in the exemplary embodiment has either a rectangular or a square configuration. The crystal may be a sodium iodide crystal doped with thallium (NaI(Tl)). Such crystals have been used in radiation detectors since 1920, and have well known properties for gamma sensitivity, spectral resolution, and light output.

The detector in the exemplary embodiment incorporates a square PMT of the type typically utilized in medical imaging applications. These PMT's are also easy to obtain and are known to have excellent spectral resolution properties. The detector will utilize quartz as the material of choice for the light pipe; however, materials with similar indices of refraction may also be used if they offer additional benefits such as reduced cost, ease of manufacture, etc.

The detector's radial suspension system includes plastic corner brackets or rails located on all four longitudinal corners of the rectangular crystal, running along approximately 90% of its length. These plastic corner brackets may be made of any suitable and readily available plastic that has a low friction coefficient. The plastic corner brackets are lined on inside surfaces thereof with a shock absorbing foam. This foam is a visco-elastic type foam that has a high degree of shock isolation and also acts as a vibration dampening material when under compression. Other types of foam may be used however, if they are suitable for the same purpose. Since the corner brackets are fitted along the four longitudinal corners of the crystal, when inserted into a housing, they will be under some degree of compression, thus allowing them to both dampen vibration as well as protect the crystal from shock. Additionally, similar foam lined rails may be placed along the four faces of the crystal with adequate spacing to suspend the crystal inside of the housing and away from the side walls.

The detector's axial suspension system includes two annular wave springs located at one end of the crystal, remote from the PMT. Compression plates to evenly distribute the load of the springs and the crystal are located on either side of the springs. The axial suspension arrangement also includes an annular wave spring around the base of the PMT. These axial suspension springs are used to maintain optical coupling between the crystal, the light pipe and PMT. Foam pads or other similar materials may be used in conjunction with the other design components to achieve the same effect as the wave springs around either the PMT or at the ends of the crystal.

The detector housing includes a main or crystal housing enclosing the crystal component and a cylindrical cover that encloses the PMT and associated electronics package. The main housing portion may be composed of a thin-walled aluminum material that will reduce the degree of gamma radiation attenuation that occurs, thus enabling the detector to measure lower energy levels of gamma radiation. Additionally, with the incorporation of the suspension system as described above, the crystal is off-set from the housing wall, thus allowing for additional protection of the side of the detector in the event that the housing is impacted in some way. Finally, since the crystal is not in intimate contact with metal, an air gap or layer of insulating air is created between it and the housing. Thus, the crystal is also less likely to suffer from thermal shock.

Accordingly, in one aspect, the invention relates to a radiation detector comprising a housing, an elongated, rectangular crystal having four longitudinally extending corners, and a photomultiplier tube both supported in the housing, with a light pipe located axially between respective facing ends of the photomultiplier tube and the crystal; and a plurality of elongated rails extending along respective ones of the longitudinally extending corners of the rectangular crystal, establishing an air gap between the crystal and the housing.

In another aspect, the invention relates to a radiation detector comprising a rectangular housing, an elongated, rectangular crystal having four longitudinally extending corners supported and a photomultiplier tube supported in the housing with a light pipe axially supported between the photomultiplier tube and the crystal; and a plurality of elongated corner brackets extending along respective ones of the elongated corners of the rectangular crystal; wherein the photomultiplier tube is substantially square in cross section; the light pipe having a substantially square face interfacing with the photomultiplier tube and a substantially rectangular face interfacing with the crystal.

In still another aspect, the invention relates to a radiation detector comprising a housing, an elongated, rectangular crystal having four longitudinally extending corners, and a photomultiplier tube both supported in the housing, with a light pipe located axially between respective facing ends of the photomultiplier tube and the crystal; a plurality of rails including shock absorbing material extending along the crystal, creating a gap between the crystal and the housing, for protecting the crystal from radial shock and vibration; and a plurality of resilient members opposite ends of the crystal for protecting the crystal from axial shock and vibration.

In still another aspect, the invention relates to a light pipe for coupling a scintillation crystal to a photomultiplier tube comprising a rectangular face for engaging a similarly-shaped face on the scintillation crystal and a square face for engaging a similarly-shaped photomultiplier tube.

The invention will now be described in detail in connection with the above identified drawings.

BRIEF DESCRIPTION OF THE DRAWINGS

FIG. 1 is a front perspective view of a portal monitoring radiation detector in accordance with a first exemplary embodiment;

FIG. 2 is a side elevation of the detector shown in FIG. 1;

FIG. 3 is a front elevation of the detector shown in FIGS. 1 and 2;

FIG. 5 is a perspective view of a light pipe component taken from FIG. 4;

FIG. 6 is a front elevation of the light pipe shown in FIG. 5; and

FIG. 7 is a bottom plan view of the detector shown in FIG. 6.

DETAILED DESCRIPTION OF THE INVENTION

Figure 4:
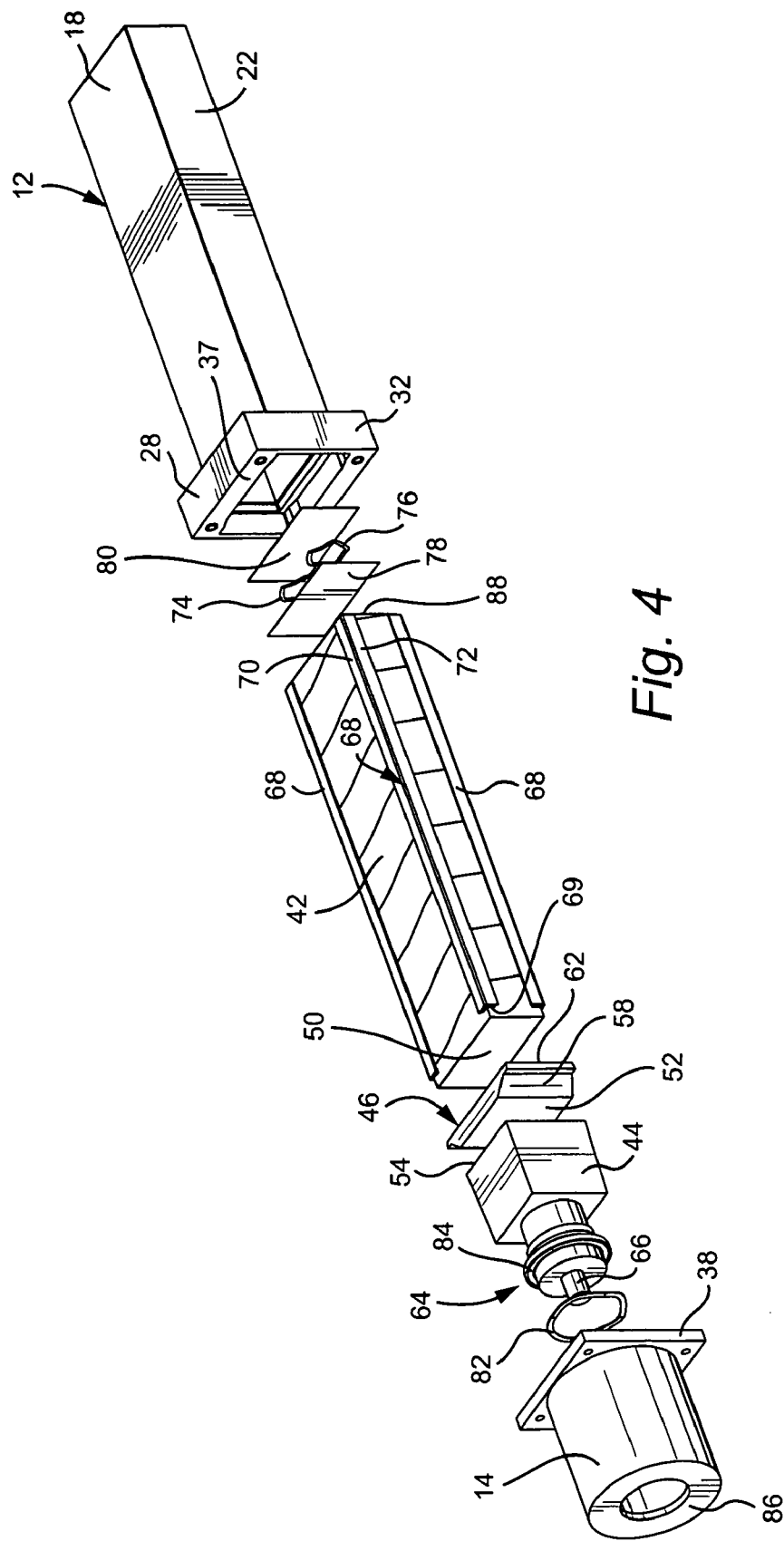
FIG. 4 is an exploded perspective view of the detector shown in FIGS. 1–3.

With initial reference to FIGS. 1–3, a portal monitoring radiation detector 10 includes a housing including a main or crystal housing 12 and a PMT cover 14 joined together at a housing interface 16. The main housing portion 12 is of generally elongated rectangular shape, having top and bottom walls 18, 20, side walls 22, 24 and an end wall 26. The opposite end of the crystal housing is enlarged, particularly in terms of the height dimension of the housing, and includes top and bottom walls 28, 30, side walls 32, 34 and an apertured end wall 36 joined to the remainder of the main housing 12. The opposite end wall 37 (also apertured) is sized to mate with a similarly shaped flange 38 on one end of the otherwise cylindrical PMT cover 14, facilitating the joining of the crystal housing 12 and PMT cover 14 by means of screw fasteners 40 or other suitable means. The crystal housing 12 may be constructed of thin-walled aluminum that will reduce the degree of gamma radiation detection, enabling the measurement of lower energy gamma radiation.

Turning now to FIG. 4, the internal components of detector 104 are shown in exploded form. The primary components are the scintillation crystal 42 and the PMT 44 arranged on, and adhered to opposite sides of a light pipe 46.

The crystal 42 is shown wrapped in a reflective tape (e.g., Teflon(®) and sized and shaped to fit within the main or crystal housing 12, with clearance to accommodate the suspension system described further herein. The crystal itself may be a sodium iodide crystal doped with thalium (NaI(Tl)). Typical measurements for the crystal may be 2" wide×4" deep×16" long, or 4" wide×4" deep×16" long. These particular dimensions are not exclusive, but represent the general boundaries that those knowledgeable in the art have used previously to build radiation detectors for these purposes.

The PMT 44 in the exemplary embodiment is square in shape. For the 2"×4"×16" crystal type detector, a 3"×3" square PMT will be utilized.

Light pipe 46 (see also FIGS. 5–7) is interposed between the crystal 42 and PMT 44 and has a rectangular face 48 for engagement with similarly shaped face 50 of the crystal, and a square face 52 for engagement with a similarly shaped face 54 of the PMT. This means that, based on the above noted dimensions, 8 sq. in. of surface area emitting light from the crystal is being optically coupled to a 9 sq. in. surface area on the light pipe, thus maximizing the light transfer. Angled surfaces 56, 58 extend between the square face 52 and the back side of rectangular face 48, forming flanges 60, 62 along the vertical side edges of the light pipe. During assembly, the light pipe 46 is oriented as shown in FIG. 4 and couples the crystal 42 to the PMT 44 via a conventional optical gel on its opposite faces 48 and 52. As well understood in the art, the light pipe transmits light generated by the crystal 42 to the PMT 44. The opposite end of the PMT 44 is coupled to a conventional electronic package 64 that, when assembled, projects from the distal end of the PMT cover 14 as best seen in FIG. 2, with cables (not shown) extending from the cable bushing 66.

Plastic corner brackets or rails 68 (three of four shown) are located along the four corner edges of the crystal 42, and extend along about 90% of the length of the crystal. Each corner bracket includes a pair of elongated edge surfaces 70, 72 arranged perpendicular to each other so as to engage respective perpendicular corner edges of the crystal. The inward facing surfaces of the corner brackets 68 are lined with a shock absorbing foam, for example, a visco-elastic type foam 69 that exhibits a high degree of shock isolation, and that also acts to dampen vibration when under compression. In this regard, the corner brackets in the fully assembled detector are in compression in a direction substantially perpendicular to a longitudinal axis of the crystal 42. The brackets 68 themselves are constructed of any suitable plastic material with a low coefficient of friction to facilitate sliding insertion of the crystal 42 into the main housing 12. This arrangement also provides an air gap between the crystal and the housing, on all four sides of the crystal. This layer of insulating air provides additional thermal and impact protection for the crystal. In an alternative arrangement, generally similar foam-lined rails may be placed along the four faces of the crystal, with or without the corner brackets or rails.

The detector suspension system also includes a pair of annular wave springs 74, 76 located axially between a pair of rectangular compression plates 78, 80 (e.g., 0.030 inch thick stainless steel). The springs are a suitable metal but could also be ceramic. This assembly of plates and springs is located axially between the forward face 88 of the crystal 14 and the forward end wall 26 of the housing 12. A similar but larger diameter annular wave spring 82 is also placed around one end of the electronic package 64, sandwiched between annular flange 84 and end wall 86 of the PMT cover 14. Thus, not only is the crystal 42 protected from shock and vibration by a radial suspension system, but also by an axial suspension system that, in addition, maximizes the coupling of the crystal 42 and PMT 44 to the light pipe 46. It will be appreciated that the wave springs 74, 76 and 82 may be replaced by suitable foam pads or other suitable resilient members.

Testing with the above described detector conforms that there is virtually no loss of spectral resolution or light output by utilizing the crystal, PMT and light pipe configuration as described above.

The detector as described may be used as a gamma radiation detector inside a housing and placed near a portal through which people and vehicles, cargo or other similar things may pass. It may also be beneficial in portals that "see" large amounts of vibration such as near trains and the like.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A radiation detector comprising a housing, an elongated, rectangular crystal having four longitudinally extending corners, and a photomultiplier tube both supported in said housing, with a light pipe located axially between respective facing ends of the photomultiplier tube and the crystal; and a plurality of elongated rails extending along respective ones of said longitudinally extending corners of said rectangular crystal, establishing an air gap between said crystal and said housing, said rails each including mutually perpendicular elongated side surfaces.

2. The radiation detector of claim 1 wherein said rails extend along about 90% of a length dimension of said crystal.

3. The radiation detector of claim 1 wherein said rails are under compression in a direction substantially perpendicular to a longitudinal axis of said crystal.

4. The radiation detector comprising of claim 1 wherein each of said elongated side surfaces is lined on an inward facing surfaces thereof with foam shock absorbing material.

5. The radiation detector of claim 4 wherein said rails are composed of low-friction plastic material.

6. The radiation detector of claim 1 wherein said housing is also rectangular, and at least one resilient member is located at one end of said crystal, axially between said housing and said crystal.

7. The radiation detector of claim 6 wherein said at least one resilient member comprises a spring.

8. The radiation detector of claim 7 wherein compression plates are located on opposite axial sides of said at least one spring.

9. The radiation detector of claim 7 wherein said at least one spring comprises a pair of annular wave springs.

10. The radiation detector of claim 1 wherein said photomultiplier tube is substantially square in cross section.

11. The radiation detector of claim 10 wherein said light pipe has a substantially square face interfacing with said photomultiplier tube and a substantially rectangular face interfacing with said crystal.

12. The radiation detector of claim 11 wherein said square face has a greater surface area than said rectangular face.

13. The radiation detector of claim 11 wherein a portion of said housing enclosing said crystal is substantially rectangular in cross section.

14. The radiation detector of claim 13 wherein a substantially cylindrical photomultiplier tube cover encloses said photomultiplier tube and is joined at one end thereof to said housing at respective flange portions.

15. The radiation detector of claim 14 and further comprising an electronics package secured to an opposite end of the photomultiplier tube, said electronic package including an annular flange, and an annular spring axially engaged between said annular flange and an opposite end of said photomultiplier tube cover.

16. A radiation detector comprising a rectangular housing, an elongated, rectangular crystal having four longitudinally extending corners supported and a photomultiplier tube supported in said housing with a light pipe axially supported between the photomultiplier tube and the crystal; and a plurality of elongated corner brackets extending along respective ones of said elongated corners of said rectangular crystal each corner bracket having elongated mutually perpendicular side surfaces; wherein said photomultiplier tube is substantially square in cross section; and said light pipe having a substantially square face interfacing with said photomultiplier tube and a substantially rectangular face interfacing with said crystal.

17. The radiation detector comprising of claim 16 wherein each of said corner brackets is lined on inward facing surfaces thereof with foam shock absorbing material.

18. The radiation detector of claim 16 wherein said corner brackets are composed of low-friction plastic material.

19. The radiation detector of claim 16 wherein compression plates are located on opposite axial sides of said pair of annular wave springs.

20. The radiation detector of claim 16 wherein said corner brackets extend along about 90% of a length dimension of said crystal.

21. The radiation detector of claim 16 wherein said corner brackets are under compression in a direction substantially perpendicular to a longitudinal axis of said crystal.

22. The radiation detector of claim 16 wherein said square face has a greater surface area than said rectangular face.

23. The radiation detector of claim 16 and further comprising a pair of annular wave springs located at one end of said crystal, axially between said housing and said crystal.

24. The radiation detector of claim 16 wherein said photomultiplier tube is square and wherein a portion of said housing enclosing said photomultiplier tube is substantially round in cross section.

25. The radiation detector of claim 24 and further comprising an electronics package secured to an opposite end of the photomultiplier tube, said electronic package including an annular flange, and an annular wave spring axially engaged between said annular flange and an opposite end of said photomultiplier tube cover.

26. A radiation detector comprising a housing, an elongated, rectangular crystal having four longitudinally extending corners, and a photomultiplier tube both supported in said housing, with a light pipe located axially between respective facing ends of the photomultiplier tube and the crystal; a plurality of plastic corner rails with inward facing, mutually perpendicular surfaces extending along said corners of said crystal, creating a gap between the crystal and the housing, for protecting the crystal from radial shock and vibration; and a plurality of resilient members at opposite ends of the crystal for protecting the crystal from axial shock and vibration.

27. A light pipe for coupling a scintillation crystal to a photomultiplier tube comprising a relatively smaller rectangular face for engaging a similarly-shaped face on the scintillation crystal and a relatively larger square face for engaging a similarly-shaped photomultiplier tube.

* * * * *